April 16, 1929.  O. C. SCHROEDER  1,709,233
MECHANICAL MOVEMENT
Filed June 18, 1920  8 Sheets-Sheet 1

April 16, 1929.

O. C. SCHROEDER 1,709,233

MECHANICAL MOVEMENT

Filed June 18, 1920

Inventor:
Oscar C. Schroeder

April 16, 1929.  O. C. SCHROEDER  1,709,233
MECHANICAL MOVEMENT
Filed June 18, 1920   8 Sheets-Sheet 4
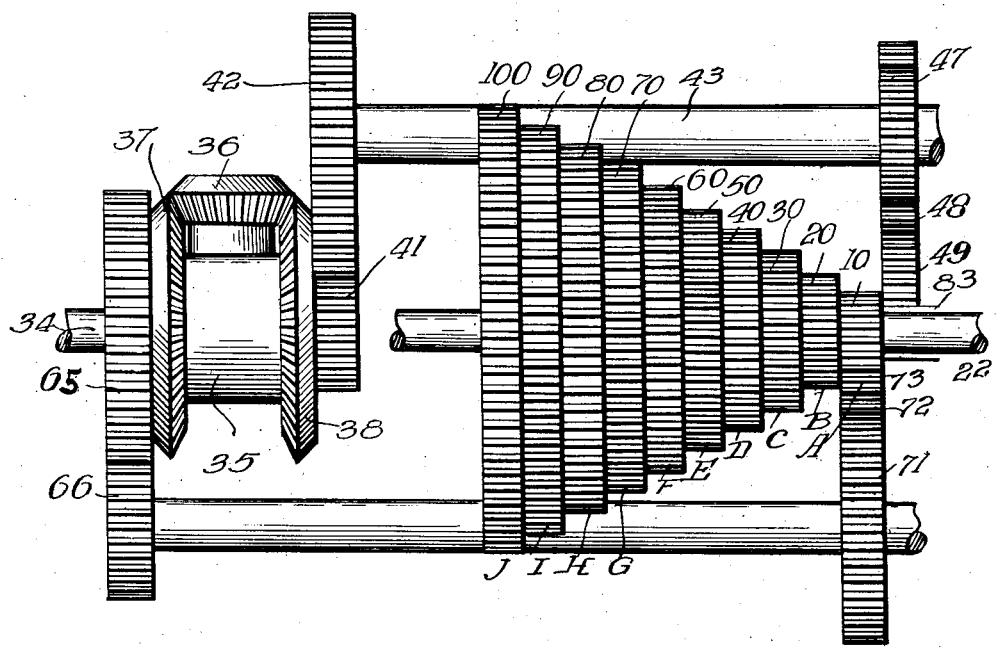
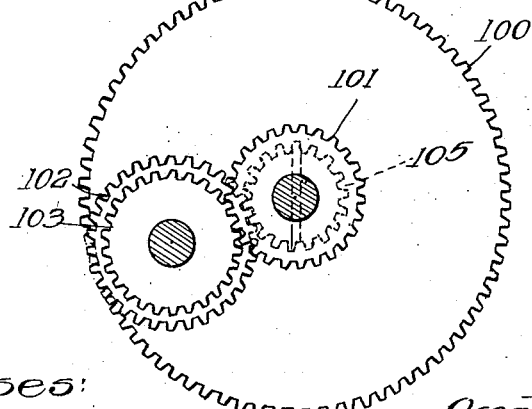
Witnesses:
Harry R. L. White
U. P. Kilroy
Inventor:
Oscar C. Schroeder.
By Williams, Bradbury,
See & McCaleb Attys April 16, 1929.　　O. C. SCHROEDER　　1,709,233
MECHANICAL MOVEMENT
Filed June 18, 1920　　8 Sheets-Sheet 5
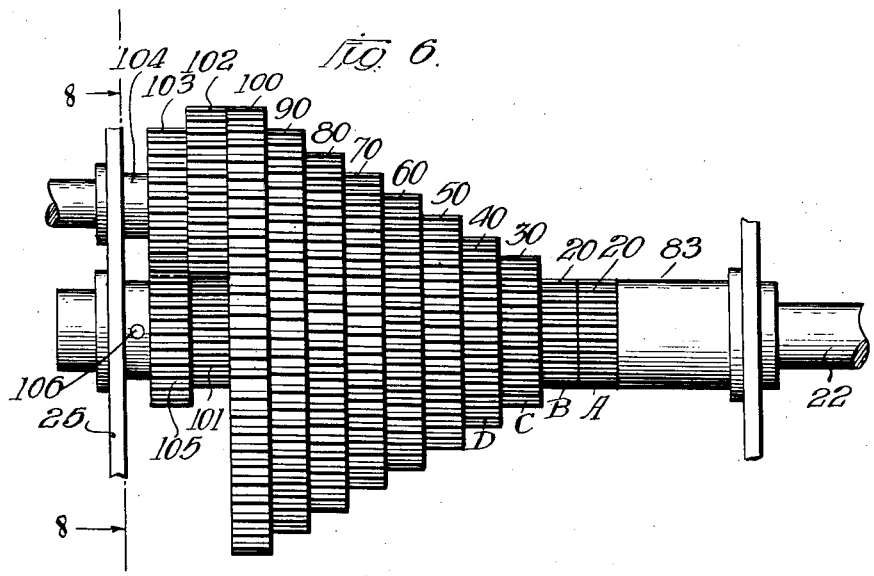
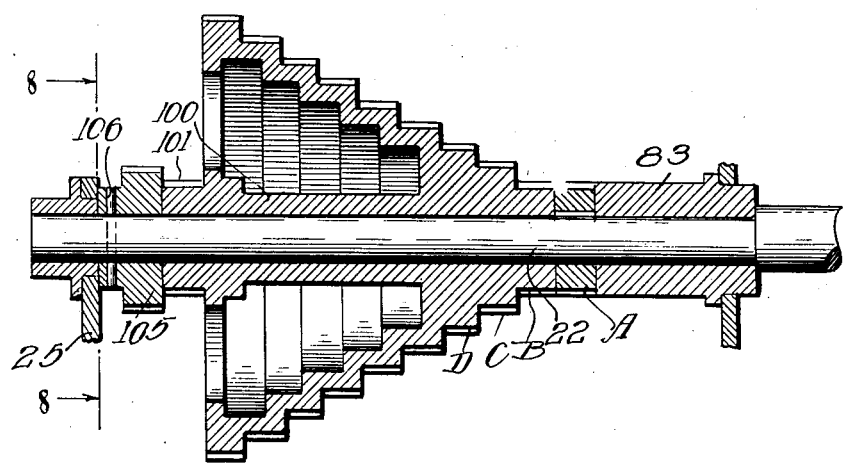
Witnesses:
Harry R. White
W. P. Kilroy
Inventor:
Oscar C. Schroeder
By Williams, Bradbury, See & McCabe Attys.

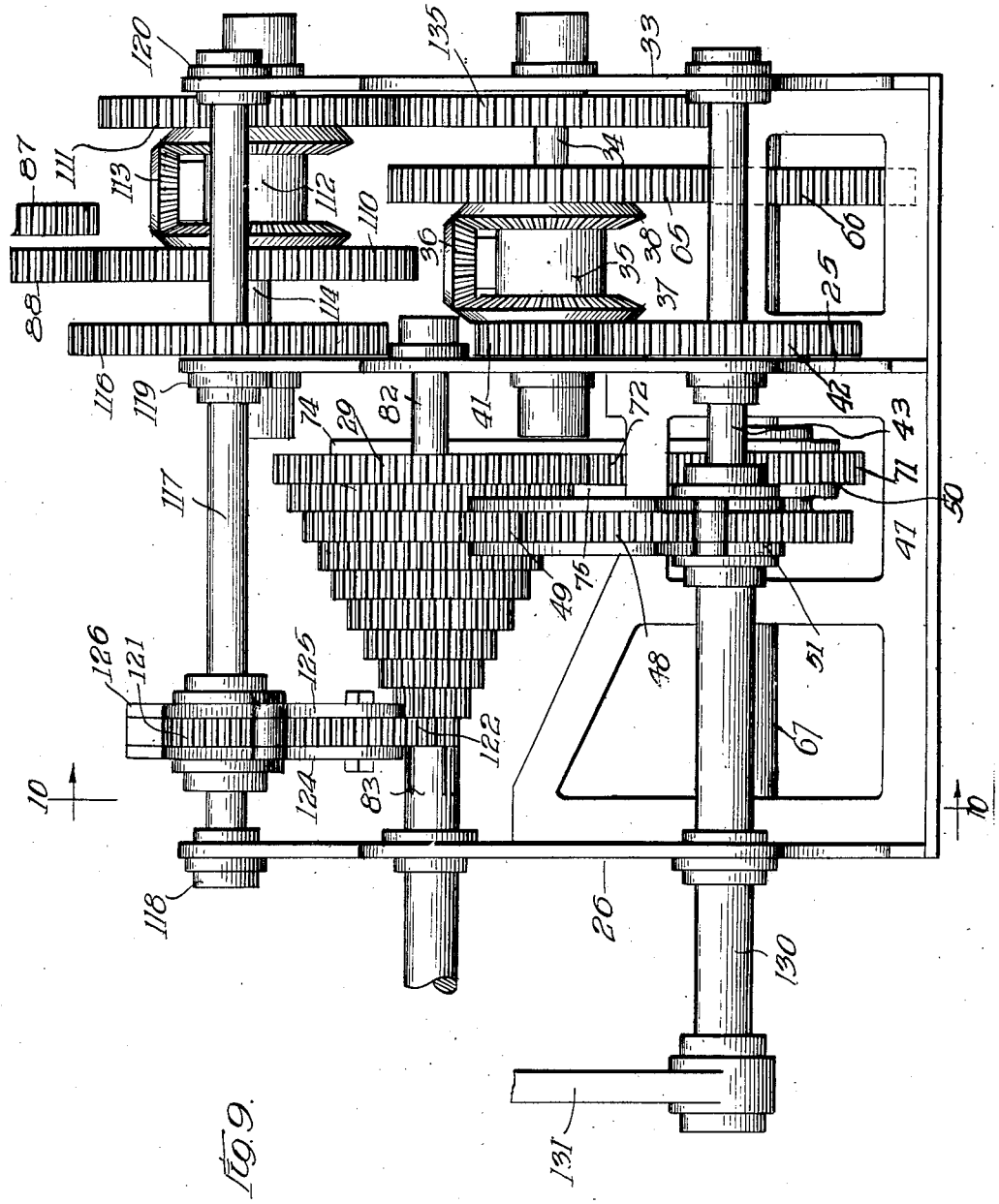

April 16, 1929.   O. C. SCHROEDER   1,709,233
MECHANICAL MOVEMENT
Filed June 18, 1920   8 Sheets-Sheet 7

Witnesses:
Harry R. L. White
W. P. Kilroy

Inventor:
Oscar C. Schroeder.
By Williams, Bradbury, See & McCaub Attys

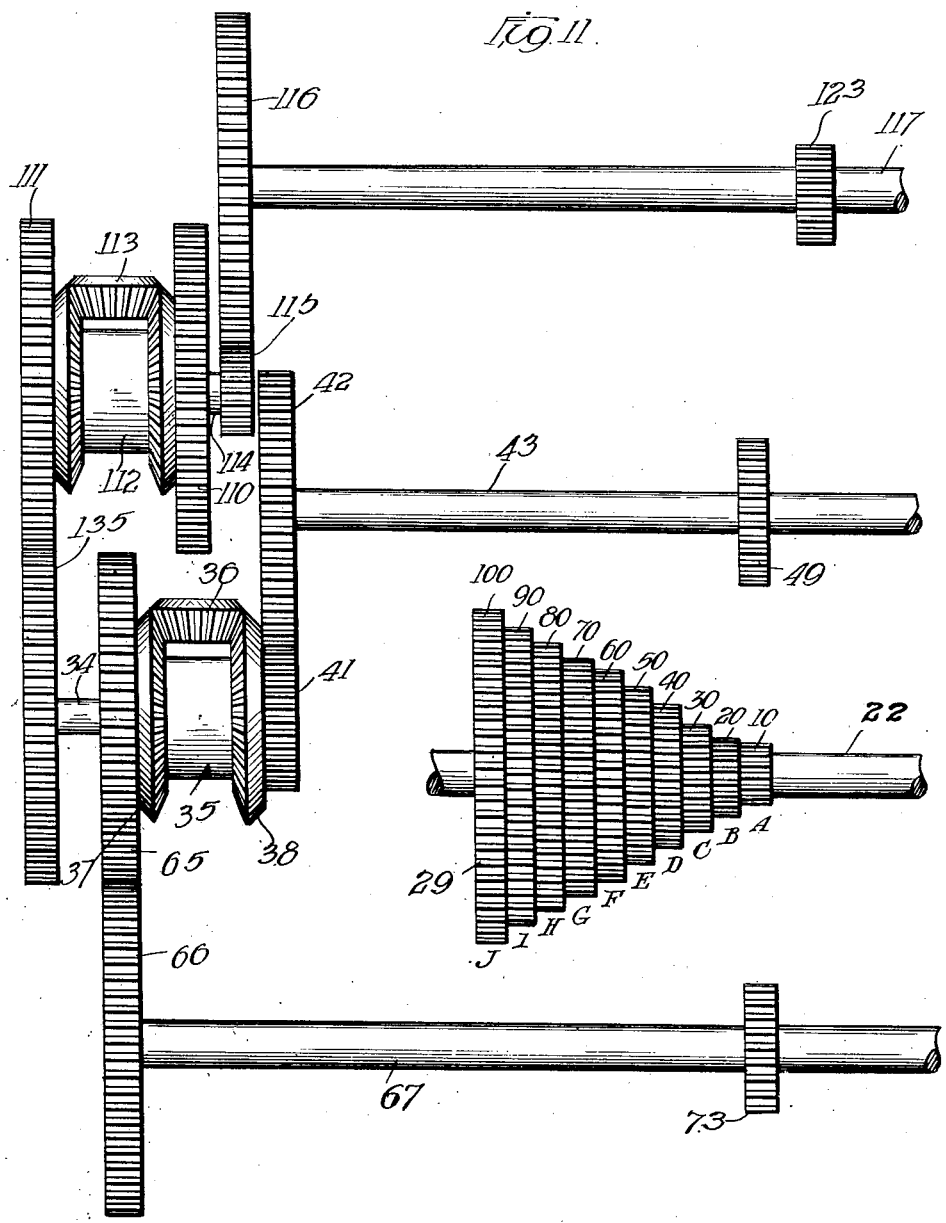

Patented Apr. 16, 1929.

1,709,233

UNITED STATES PATENT OFFICE.

OSCAR CHRISTIAN SCHROEDER, OF CHICAGO, ILLINOIS, ASSIGNOR OF FIFTY-ONE PER CENT TO HARDINGE BROTHERS, INC., OF CHICAGO, ILLINOIS, A CORPORATION OF ILLINOIS.

MECHANICAL MOVEMENT.

Application filed June 18, 1920. Serial No. 389,880.

My invention relates to a novel mechanical movement and is particularly concerned with a mechanical movement especially useful in the construction of lathes, milling machines, gear cutting machines and other similar mechanisms where it is desired to cause one shaft or driven element to rotate at any one of a plurality of rates relative to the speed of another shaft or rotating element. For instance, my invention is particularly useful as a driving connection between the live spindle and the lead screw of a lathe because it permits the driving of the lead screw from the live spindle at different rates of speed which can be selected as desired.

The objects of my invention are,

First: to provide a mechanical movement of the character described, comprising a driving shaft and a driven shaft, and means for connecting these two shafts in driving relation so that the driven shaft can be rotated at any one of a plurality of different rates relative to the speed of the driving shaft.

Second: to provide a construction of the class described whereby a large number of speed changes between the two shafts can be effected by the use of a comparatively few gears.

Third: to provide means of the character described wherein the various speeds of the driven shaft vary in arithmetical progression rather than in geometrical progression.

Fourth: to provide a construction of the character described in which the intervals between the various speeds of the driven shaft are small compared with the intervals which it is possible to obtain by the mechanisms at present in use.

Fifth: to provide a construction of the character described, comprising a driving shaft, a driven shaft and means for connecting the two shafts in driving relation, the said means comprising a differential; one element of which is driven from the driving shaft; the second element of which transmits the motion from the first-mentioned element to the driven shaft and the third element of which is controlled to vary the speed of the driven shaft, as desired, the last-mentioned element being, in turn, controlled by the speed of the driving or the driven shaft, as may be desired, and Sixth: to provide a construction having the above features, which is simple in construction, easy to operate, reliable and economical to manufacture.

Other objects will appear as this description progresses, reference being had to the accompanying drawings, in which Figure 1 is a side elevation, illustrating my invention in connection with a lathe mechanism.

Figure 5 is a schematic diagram of my improved mechanism.

Figures 6 and 7 are elevation and longitudinal sectional views showing modifications of a detail of my invention.

Figure 8 is a transverse vertical section taken along the lines 8—8 of Figures 6 and 7.

Figure 9 is a side elevation of a modified form of my invention whereby a larger number of speeds of the driven shaft can be obtained relative to the driving shaft than by means of the constructions shown in the preceding figures.

Figure 11 is a schematic diagram of the modified form of my invention.

Throughout the several views, similar reference characters will be used for referring to similar parts, and the sections are taken looking in the direction of the small arrows.

Referring for the present to Figures 1 to 5, inclusive, wherein my improved mechanism is illustrated as forming a part of a lathe for cutting screw threads or for other similar purposes, the driving shaft is illustrated as comprising a live spindle 20 which is driven by a belt connection with the cone pulley 21 in a well-known manner. The driven shaft of my improved mechanism is illustrated as a lead screw 22 which controls the movement of the cutting tool relative to the work carried between the live spindle 20 and the dead spindle (not shown) of the lathe.

Figure 1:
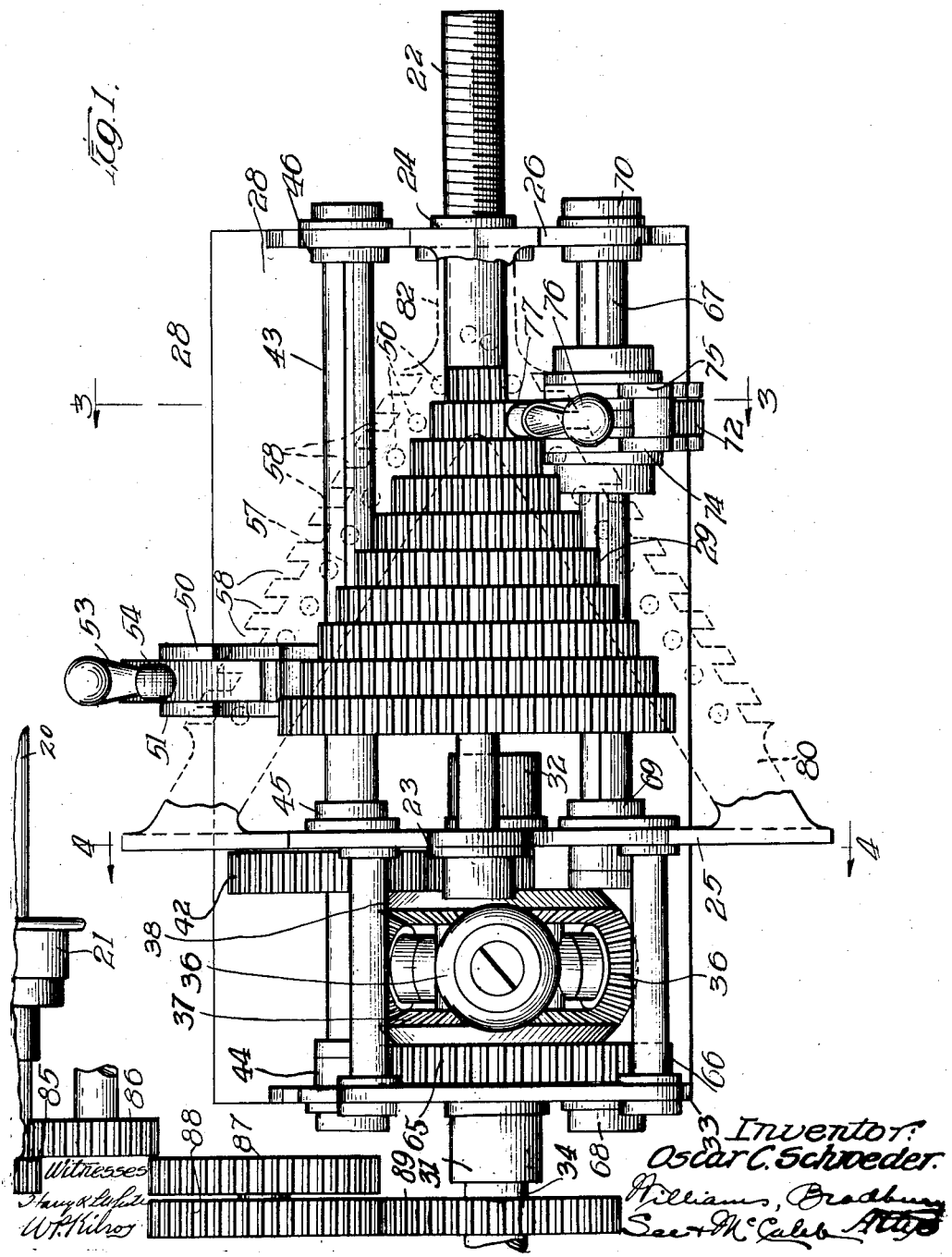
Figure 2:
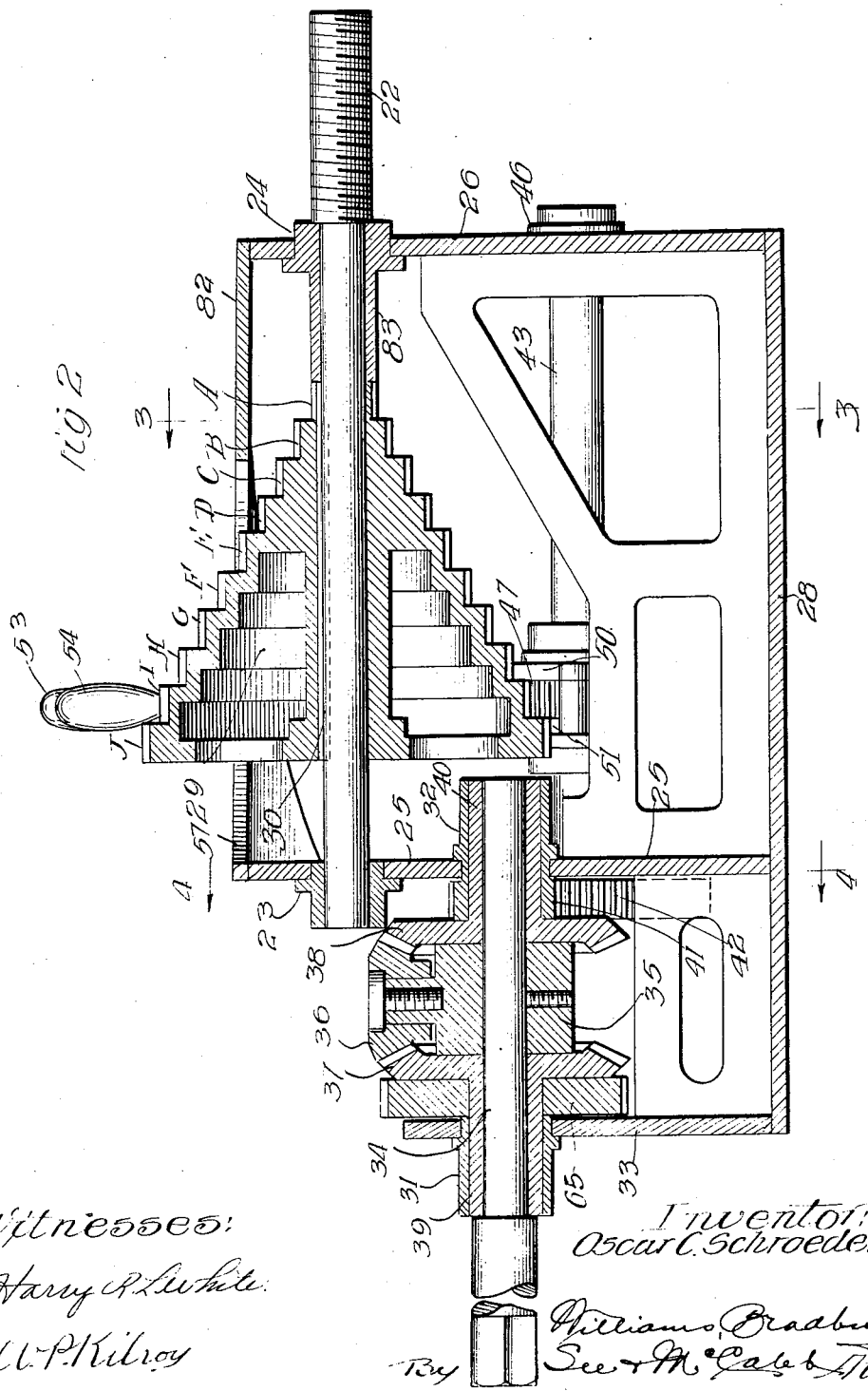
Figure 2 is a central longitudinal section through my improved mechanism.
Figure 3:
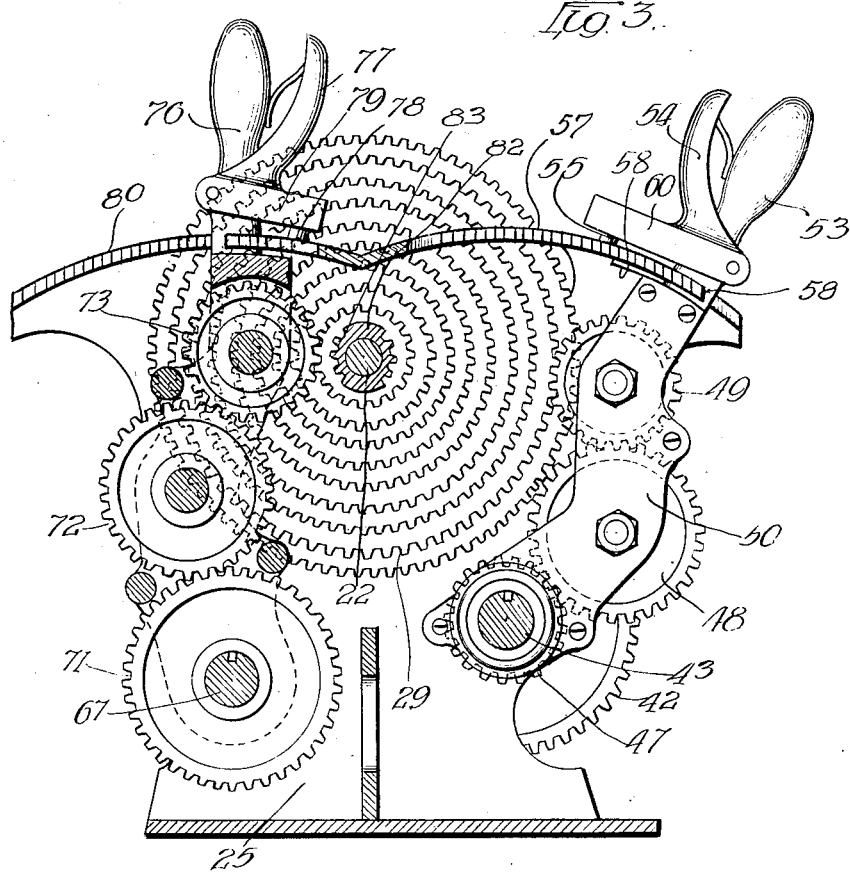
Figure 3 is a transverse section taken on line 3—3 of Figures 1 and 2.
Figure 4:
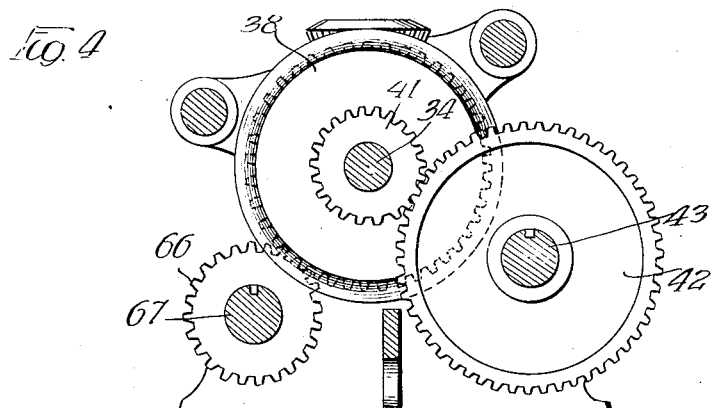
Figure 4 is a transverse section taken on line 4—4 of Figures 1 and 2.

The end of the lead screw, shown in Figures 1 and 2, is suitably supported in bearings 23 and 24 mounted upon the brackets 25 and 26, respectively. These brackets are supported by a suitable bedplate 28. A stepped cone which is illustrated as a whole by the reference character 29 is keyed to the driven shaft 22 by a key 30 so that it rotates with the driven shaft. The peripheries of the steps of the cone 29 are provided with gear teeth, the numbers of which progress in arithmetical progression, starting with the gear A, which, for the purpose of this application, will be considered as having 10 teeth, the gears B, C, D, E, F, G, H, I, and J, having 20, 30, 40, 50, 60, 70, 80, 90 and 100 teeth, respectively.

Mounted between and supported by bearings 31 and 32 supported by the brackets 25 and 33, is a differential comprising the driving shaft 34 to which is secured a spider 35, carrying a plurality of differential pinions 36, preferably three in number. The driving shaft 34, the spider 35 and the pinions 36 will hereafter be referred to as the driving element of this differential. The differential gears 37 and 38 are provided with trunnions 39 and 40 respectively, which are respectively journaled in the bearings 31 and 32 and in turn form bearings for the driving shaft 34. The two gears 37 and 38 will hereafter be referred to as the driven element of the differential.

A pinion 41 is shrunk upon the trunnion 40 or otherwise secured to the differential gear 38 so as to rotate therewith and meshes with the gear 42, (see Figures 1, 3 and 4,) which is keyed to the shaft 43. The shaft 43 is mounted in bearings 44, 45 and 46 supported by the brackets 33, 25 and 26 respectively in spaced parallel relation to the driven shaft 22 and adjacent the faces of the gears A, B, C, etc.

A gear 47 is splined to the shaft 43 and is designed to communicate the motion of the shaft 43 to any one of the gears of the cone 29 as desired through the medium of the gears 48 and 49 which form a gear train extending from the gear 47 to the gear of the cone 29 selected by the operator, the gears 47, 48 and 49 being confined between the two plates 50 and 51, the lower ends of which are slidably mounted upon the shaft 43 and the ends of which are secured to a handle 53 which is provided with a spring-pressed detent 54 carrying a pin 55 at its inner end for co-acting with the openings 56 in the detent plate 57 to hold the gear 49 in proper co-acting relation with the desired gear of the cone. The outer edge of the detent plate 57 has a plurality of notches 58 formed therein for receiving a portion of handle 53 to properly align the gear 49 with the gears of the cone.

From the above description, it will be clear that by grasping the handle 53 and disengaging the detent from the detent plate, the lever formed by the handle 53 and the two plates 50 and 51 can be adjusted longitudinally of the shaft 43 so as to bring the gear 49 into mesh with any one of the cone gears and locked in this position.

From the above description, it will be seen that if the driven gear 37 of the differential is held stationary and the shaft 34 rotated, the driven gear 38 of the differential will be rotated and its motion will be communicated through the pinion 41, gear 42, shaft 43 and gears 47, 48 and 49 to the driven shaft 22 through any one of the cone gears with which the gear 49 is in mesh. The speed of the driven shaft can be controlled in the usual manner by shifting the gear 49 from one to the other of the cone gears. In this manner, 10 different speeds of the driven shaft relative to the driving shaft may be obtained.

To obtain other speeds of the driven shaft relative to the driving shaft, I provide means for permitting the rotation of the driven gear 37 of the differential in the direction that the shaft 34 rotates, which will have the effect of reducing the number of revolutions of the gear 38 relative to the shaft 34 and consequently reducing the number of revolutions of the driven shaft, relative to the driving shaft. This means comprises a gear 65, secured to the trunnion 39 of the differential gear 37 to rotate therewith. The gear 65 meshes with the gear 66 keyed or otherwise secured to the shaft 67. The shaft 67 is journaled in the bearings 68, 69, and 70, supported by the brackets 33, 25 and 26 respectively. A gear 71 is splined upon the portion of the shaft 67 intermediate the bearings 69 and 70, and can be connected in driving relation with any one of the cone gears by means of the intermediate gears 72 and 73, which in common with the gear 71 are clamped and supported between the two side plates 74 and 75 which are journaled upon the shaft 67 so that they can rotate or slide upon the shaft as desired. The handle 76 is secured to the upper ends of the side plates 74 and 75 and provided with a detent 77, having a pin 78 and a projection 79 secured thereto, which function in the same manner as the pin 55 and projection 59 of the detent 54, to secure the lever formed by the side plates 74 and 75 and the handle 76 to the detent plate 80 in any one of its adjusted positions.

The extended portion 82 of the bearing 24 is provided on each side with a plurality of gear teeth 83 adapted to mesh with the teeth of either the gear 49 or the gear 73, so as to lock the gear trains connected with either of these gears and thus hold either the differential gear 37 or the differential gear 38 stationary, as the case may be.

In Figure 1, I have shown the shaft 34 as being connected with the live spindle 20 of a lathe by means of the intermediate gears 85, 86, the compound gears 87, 88, and the gear 89. In Figure 5 I have shown a schematic diagram of my improved mechanism, the connection between the live spindle and the shaft 34 being omitted.

I shall now by referring to Figure 5 explain the operation of the embodiment of my invention described above. Assuming for the present that the gear 49 is locked to the teeth 83 so that the gear train connected with the gear 49 is locked against rotation, and assuming that a driving relation has been established between the live spindle 20 and the driving shaft 34 of the differential, the spider 35 will be rotated about its axis and carry the pinions 36 with it. Since the differential gear 38 is locked against rotation, the differential gear 37 will be caused to rotate twice as fast as the shaft 34, that is, the gear 37 will make two complete revolutions to each revolution of the shaft 34. Since the gear 65 is connected directly to the differential gear 37 it will also make two complete revolutions to each revolution of the shaft 34, and its movement will be communicated to the gear 71 through the pinion 66 and the shaft 67. Assuming that the gear 73 is in mesh with the cone gear A, this gear, and consequently the driven shaft 22, will be rotated at a definite speed relative to the driving shaft, depending upon the various ratios of the gear train connecting the driving shaft with the driven shaft. If the gear 73 is shifted into mesh with the gear B which has 20 teeth, the shaft 22 will be driven at one-half its former speed, and if the gear 73 is shifted into mesh with the cone gear C the driven shaft will be driven at one-third its former speed. Assuming a one to one driving connection between the driving shaft or live spindle, and the shaft 34 of the differential and that the gears 65, 66, 71 and A are provided with 60, 30, 50 and 10 teeth respectively, as indicated in Figure 5, the shaft 22 will make 20 revolutions to each revolution of the driving shaft. If the driving shaft is the live spindle of a lathe, and the driven shaft 22 is the lead screw of a lathe, having a 20 pitch, then with the connections just described the lathe would cut a screw having a pitch of 1. If the gear 73 is brought into mesh with the gear B having 20 teeth, the lead screw would rotate only half as fast as formerly, and the thread cut would have a pitch of 2. In a similar manner, by shifting the gear 73 into mesh with the gears C, D, E, F, G, H, I, and J, threads having a pitch of 3, 4, 5, 6, 7, 8, 9 and 10 respectively would be cut.

If the gear 73 is now locked by bringing it into meshing relation with the teeth 83 and the gear 49 is brought into co-acting relation with the teeth of the gear A, the differential gear 37 will be locked against rotation and upon rotation of the shaft 34 the differential gear 38 will be rotated at twice the speed of the shaft 34. The movement of the differential gear 38 will be transmitted to the gear 49 through the gears 41, and 42, the shaft 43, and the gears 47 and 48. If the gears 41, 42, 47 and A are provided with 24, 60, 25 and 10 teeth respectively, as indicated in Figure 5, the shaft 22 will make two revolutions to each revolution of the driving shaft, consequently, if the driven shaft 22 is provided as described above with a 20 pitch thread, the lathe with this setting of the gear 49 will cut a 10 pitch thread. If now the gear 49 has shifted to the gear 20, the shaft 22 will be rotated only half as fast as formerly, and a 20 pitch thread will be cut. In a similar manner by successively shifting the gear 49 into driving relation with the remaining cone gears, threads of 30, 40, 50 and so on up to 100 pitch can be successively cut.

For the purpose of explaining how threads lying between the decimal numbers 10, 20, 30, etc. can be cut, we shall assume that both the gears 49 and 73 are brought into mesh with the gear A having 10 teeth. With these driving connections established, it will be easier to understand the operation if it is assumed that the gear 10 is positively driven through the differential, the gears 41 and 42, the shaft 43 and the gears 47, 48 and 49, and that the gear A acts as a driver for the differential gear 37 through the gear 71, shaft 67 and gears 66 and 65, causing the gear 37 to rotate in the same direction as the shaft 34 and thereby correspondingly diminishing the movement of the shaft 34 communicated to the gear 10 and the shaft 22. It will, of course, be understood that the faster the gear 37 rotates in the direction of rotation of the shaft 34, the slower the gear 38 will rotate, until when the gear 37 rotates equally as fast as the shaft 34, the gear 38 will also rotate at the same speed; and when the gear 37 rotates twice as fast as the shaft 34, the gear 38 will remain stationary.

The gear train 73, 72, 71, shaft 67, gears 66 and 65 are so proportioned that they will, when the gear 73 is in mesh with any one of the cone gears, cause variations in the movement imparted to the shaft 22 through the differential, the gears 41, 42, shaft 43, and gears 47, 48 and 49, the various speeds differing from each other by decimal increments or decrements, as the case may be. This will be more clearly understood from the following mathematical explanation:

Let $N_{20}, N_{37}, N_{38}$, and $N_{22}$, represent the number of revolutions of the live spindle or shaft 34, gear 37, gear 38 and the driven shaft 22, respectively, during any given operation, and let $X$ equal the number of teeth on the cone gear engaged by the gear 73 and $X'$ equal the number of teeth on the cone gear engaged by the gear 49.

Then $$\frac{N_{37}}{N_{22}} = \frac{X}{50} \times \frac{30}{60} = \frac{X}{100} \quad (1)$$

or $$N_{37} = \frac{X N_{22}}{100} \quad (2)$$

and $$\frac{N_{38}}{N_{22}} = \frac{X'}{25} \times \frac{60}{24} = \frac{X'}{10} \quad (3)$$

or $$N_{38} = \frac{X' N_{22}}{10} \quad (4)$$

Now $$N_{20} \text{ or } N_{34} = \frac{1}{2}(N_{37} + N_{38})$$

Substituting the values of $N_{37}$ and $N_{38}$ found in (2) and (4)

$$N_{20}, \text{ or } N_{34} = \frac{1}{2}\left(\frac{X N_{22}}{100} + \frac{X' N_{22}}{10}\right)$$

or $$N_{20} = \frac{X N_{22} + 10 X' N_{22}}{200}$$

$$\frac{N_{20}}{N_{22}} = \frac{X + 10 X'}{200} \quad (5)$$

Equation 5 explains the relation between the movements of the shafts 20 and 22 or the shafts 22 and 34, the shafts 20 and 34 being geared to each other in a 1 to 1 relation in terms of the numbers of teeth of the cone gears engaged by the gears 49 and 73. For example, if it be assumed that the gear 49 is in mesh with the locking gear 83 and the gear 72 is in mesh with the cone gear A having 10 teeth then $$\frac{N_{20}}{N_{22}} = \frac{10+0}{200} \text{ or } \frac{1}{20}$$

i. e. the shaft 20 will make one revolution to twenty revolutions of the shaft 22. If the shaft 22 is a lead screw having a pitch of 20, with this set-up the lathe would cut a thread having a thread of one pitch.

If instead of being locked to the gear 83 the gear 49 is in mesh with, say, the cone gear D having 40 teeth, and the gear 73 is in mesh with the cone gear I, having 90 teeth, then $$\frac{N_{20}}{N_{22}} \text{ will equal } \frac{90+400}{200} = \frac{49}{20}.$$

With the lead screw having a 20 pitch the lathe would cut 49 teeth. By similarly applying the various combinations of set-ups which it is possible to establish with the two gears 49 and 73. It will be seen that with this arrangement any integral number of threads from 1 to 110 per inch can be cut by the mechanism described. The last-named thread will be cut when both the gear 49 and the gear 73 are in mesh with the cone gear J. By properly marking the detent plate 80 with the numbers 0, 1, 2, 3, 4, 5, 6, 7, 8, 9, 10, opposite the gears 83, A, B, C, D, and so on, respectively, and the detent plate 57 with the numbers, 0, 10, 20, 30, 40, 50, 60, etc. opposite the gears 83, A, B, C, D, E, etc. respectively, the workman will be enabled to so connect the live spindle with the lead screw as to cut any threads from one to 110 without any computations whatever. In the construction shown in Figures 1 to 5 inclusive, the cone gear A is provided with 10 teeth. This number of teeth would usually be considered too small to be used in a precision lathe, and in Figures 6, 7 and 8, I have shown a modified embodiment of my invention whereby the number of teeth in the gear A can be increased to 20. In this construction, the cone gear A is keyed or otherwise secured to the shaft 22, but the remaining gears B, C, D, E, F, etc. are formed on a sleeve 100, which is rotatably mounted upon the shaft 22, and geared thereto through the gear 101 secured to one end thereof, the compound gears 102 and 103 which are rotatably mounted upon a stud 104 carried by the bracket 25, and the gear 105 which is secured to the shaft 22 by the pin 106, or in any other suitable manner, and meshes with the gear 105. By doubling the number of teeth on the gear A, the speed of the shaft 22 on any speed of the gear 49 is halved, consequently, to maintain the proper relation between the gears B, C, D, E, F, and so on, and the shaft 22, the gears 101, 102, 103, and 105 must form a 1 to 2 reduction between the cone gears B, C, D, etc. and the shaft 22. With this construction, the same results will be obtained as with that disclosed in Figures 1 to 5 inclusive, except that because of the double reduction between the gear 49 and the shaft 22, the pitch on the lead screw must be changed to 10.

It will, of course, be clear that by making the cone gears B, C, D, etc., twice as large as they are in the construction shown in Figures 1 to 5 inclusive, it would be unnecessary to provide the double reduction gearing between the shaft 22 and the cone gears. This, however, would make the size of the cone gears B, C, D, E, etc., too large for many purposes.

Figure 10:
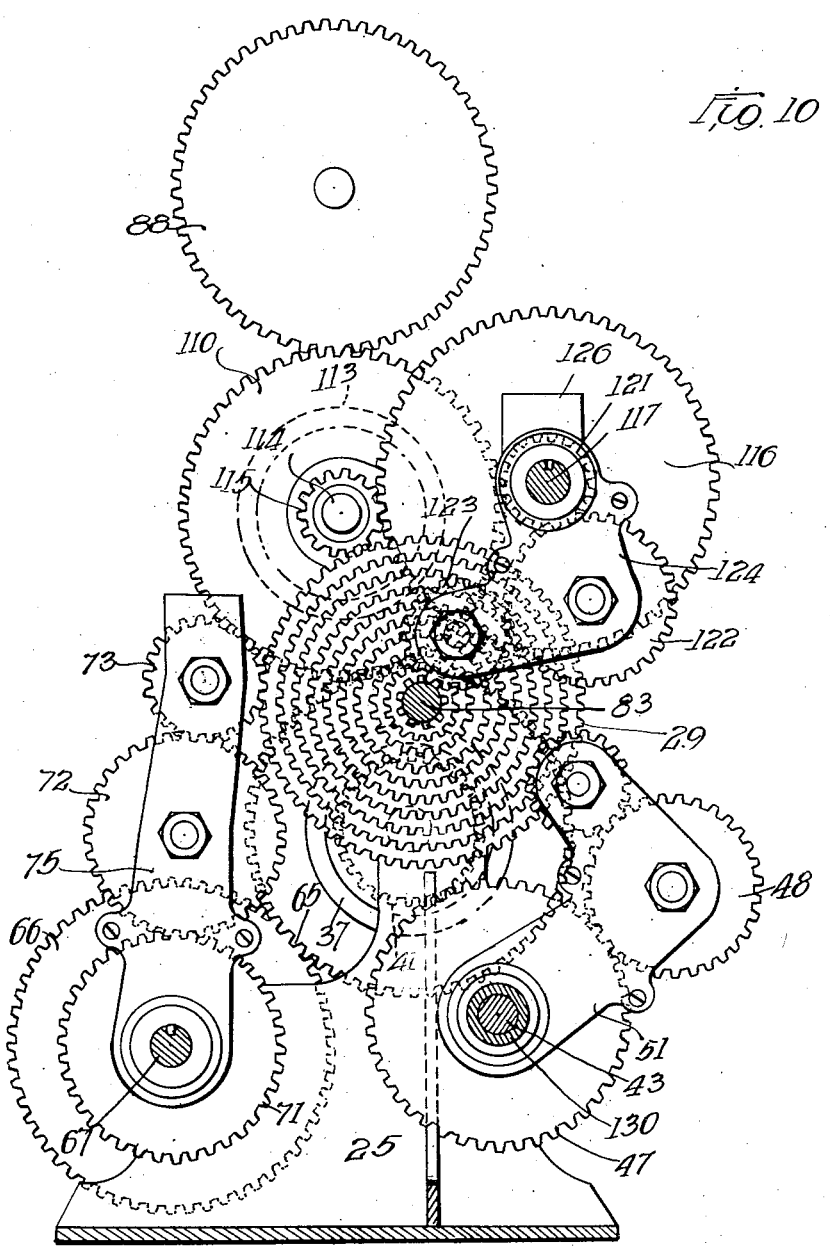
Figure 10 is a transverse section taken on line 10—10 of Figure 9.

In Figures 9, 10 and 11, I have shown a modified embodiment of my invention by means of which, broadly speaking, a much larger range of speeds between the driving shaft and the driven shaft may be obtained. If the construction shown in these figures is applied to a lathe having a lead screw of 20 pitch any integral number of threads from 1 to 1100 per inch can be cut, the threads running in arithmetical progression with intervals of one. The construction shown in these figures is similar to that shown in Figures 1 to 5 inclusive, with the following exceptions:

A second differential is interposed between the driving shaft and the shaft 34 of the differential shown in Figures 1 to 5 inclusive, this second differential comprising a differential gear 111, a second differential gear 110 which is driven from the live spindle (not shown) through the compound gears 87 and 88. The differential gear 110 will hereafter be referred to as the driving element of the second differential, and the spider 112, the differential pinions 113 and the shaft 114, (see Fig. 10) to which the spider is secured, will be referred to as one of the driven elements of the second differential and the differential gear 111 will be referred to as the other driven element of this differential. The shaft 114 is provided with a gear 115 (see Fig. 10) which meshes with a gear 116 keyed to the shaft 117. The shaft 117 is rotatably mounted in the bearings 118, 119, 120, carried by the brackets 25, 26 and 33. A gear 121 is splined to the shaft 117 to slide thereon between the bearings 118 and 119 and may be connected in driving relation with any one of the cone gears A, B, C, D, E, and so on, by the gears 122 and 123, which are supported and clamped between the side plates 124 and 125, to the upper ends of which are secured a handle 126 and detent mechanism (not shown), similar to those described in connection with Figures 1 to 5, inclusive, and a detailed description of which is, therefore, thought to be unnecessary. The lever formed by the handle 126 and the two side plates is rotatably mounted upon the shaft 117, so that the gear 123 can be brought in meshing relation with either the lock gear 83 or any one of the cone gears.

In order to provide room for the swinging of the gears 123 and 122 the shape of the side plates 51 and 50 has been somewhat altered, as shown in Figure 10, to bring the gear 49 in contact with the cone gears at a point lower on the periphery thereof and the handle has been eliminated. In order to properly manipulate the gear 43, the lever comprising the side plates 50 and 51 is mounted upon a tube 130, which is slidably mounted upon the shaft 43 and the outer end of which is provided with a handle 131, by means of which the tube 130 and the gears mounted thereon can be rocked and slid longitudinally of the shaft 43 as may be desired.

The gear 111 of the second differential is connected with the shaft 34 of the first differential by means of a gear 135. The gears 116, 110, 111, 135, 65 and 66 in the modification shown are all of the same size.

Figure 11 is a schematic diagram of the construction shown in Figures 9 and 10, and the operation of the construction shown in Figures 9, 10, and 11 is similar in principle to that shown in Figures 1 to 5 inclusive, except that for all threads above 100 pitch (considering my invention as applied to a lathe) the gear 123 will be used. The shaft 22 can then be considered as being driven through the gear train connected with the gear 123. The movement transmitted to the shaft through this gear train will be modified in the tens place by the action of the gear 49 and its gear train, and in the units place by the action of the gear 73, and its connected gear train. With either the gear 49, 73 or 123, or any two of these gears in mesh with the lock gear 83, the corresponding digit, or digits, as the case may be, in the number representing the number of teeth cut, will be a zero, or zeros. For instance, with the gear 49 locked to the gear 83, the gear 73 in mesh with the cone gear C, and the gear 123 in mesh with the cone gear D, a 403 pitch thread will be cut. With gears 49 and 123 in mesh with gears C and D respectively, and gear 73 locked to gear 83, a 430 pitch thread will be cut. With gears 49 and 73 in mesh with gears C and D respectively, and gear 123 locked to gear 83 a 34 pitch thread will be cut. Finally, with gear 49 in mesh with gear D and with both gears 73 and 123 locked to gear 83, a 40 pitch thread will be cut.

With the construction shown in Figures 9, 10 and 11, and a 20 pitch lead screw, any thread from 1 to 1110, in arithmetic progression, with intervals of one, can be cut, and if the cone gear J is omitted, as it probably would be in practice, any thread from 1 to 999 can be cut.

The following mathematical demonstration of the operation of the construction shown in Figures 9, 10 and 11 may be of assistance:

For any given operation, let $N_{110}$, $N_{111}$, $N_{114}$, equal the number of revolutions of the gears 110 and 111, and the shaft 114, and let $X''$ equal the number of teeth in the cone gear engaged by the gear 123, also let $N_{20}$, $N_{22}$, $X$ and $X'$ represent the quantities they stand for in equation (5) above:

Then with the various gears having the number of teeth indicated in Figure 11, $$\frac{N_{114}}{N_{22}} = \frac{X''}{20} \times \frac{100}{20} = \frac{X''}{4} \quad (6)$$

or $$N_{114} = \frac{N_{22} X''}{4} \quad (7)$$

In the construction shown in Figure 11, the gear 111 rotates in a direction opposite to the direction of rotation of the gear 110, so $$N_{114} = \tfrac{1}{2}(N_{110} - N_{111}) \quad (8)$$

or $$2N_{114} = N_{110} - N_{111} \quad (9)$$

But $N_{111}$ rotates at the same speed as shaft 34, or live spindle 20 in the construction shown in Figures 1 to 5 inclusive.

Therefore, since from (5)

$$N_{20} = \frac{N_{22}X + 10N_{22}X'}{200} \quad (10)$$

Substituting in equation (9) the values for $N_{114}$ and $N_{111}$ found in equations (8) and (10)

$$\frac{2N_{22}X''}{4} = N_{110} - \frac{(N_{22}X + 10N_{22}X')}{200} \quad (11)$$

or $$N_{110} = \frac{N_{22}X''}{2} + \frac{N_{22}X + 10N_{22}X'}{200} \quad (12)$$

or $$N_{110} = \frac{N_{22}X + 10N_{22}X' + 100N_{22}X''}{200} \quad (13)$$

Transposing:

$$\frac{N_{110}}{N_{22}} = \frac{X + 10X' + 100X''}{200} \quad (14)$$

If, as described above, gear 110 is connected with the live spindle 20 by a one to one gear ratio then, $$N_{20} = N_{110}, \quad (15)$$

and, finally, $$\frac{N_{20}}{N_{22}} = \frac{X + 10X' + 100X''}{200} \quad (16)$$

Equation (16), therefore, expresses the relation between the movements of the shafts 20 and 22 in terms of the number of teeth in the cone gear engaged by the gears 49, 73 and 123 respectively.

If the two gears 87 and 88 are compounded 113 to 355 the shaft 22 can then be used for obtaining modular pitches, useful in cutting gears, hobs, etc., and if these two gears are compounded 50 to 127, then the latter can be used for cutting metric threads. Every metric thread cut by my mechanism will be a useful thread, as there will be no "bastard" threads, such as are obtained when it is attempted to use the present English thread cutting lathes for cutting metric threads.

While I have described the details of the preferred embodiments of my invention in connection with a lathe construction, it is to be clearly understood that this description is merely illustrative of its use, and that my invention is in no way limited to this use, but is capable of other adaptations, and modifications, within the scope of the appended claims. It is apparent that in my improved mechanism the shaft 22 can be used as the driving shaft, and the shaft 20 as the driven shaft, consequently in the claims the words "driving" and "driven" are merely used to facilitate description and are not to be considered in their absolute sense.

Having thus described my invention, what I claim is:

1. The combination with a driving and a driven shaft, of means located therebetween for driving said driven shaft at various speeds, relative to said driving shaft, comprising a plurality of gears, the number of teeth of which increase in arithmetic ratio, mounted to rotate about a common axis and connected with said driven shaft in driving relation, first, second and third shafts extending parallel with the axis of said gears, a driving gear splined to each of said first, second and third shafts, a shift lever slidable in each of said last mentioned shafts and provided with means for establishing a driving connection between said driving gear and any one of said plurality of gears, a first differential having its driven elements connected in driving relation with said first and second shafts respectively, a second differential having one driven element connected in driving relation with said third shaft, and its other driven element connected in driving relation with the driving element of said first differential, and means for driving said last mentioned element from said driving shaft.

2. The combination with a driving and a driven shaft, of means located therebetween for driving said driven shaft at various speeds, relative to said driving shaft, comprising a plurality of gears connected with said driven shaft in driving relation, first, second, and third shafts, a driving gear splined to each of said first, second and third shafts, a shift lever slidable in each of said last mentioned shafts and provided with means for establishing a driving connection between said driving gear and any one of said plurality of gears, a first differential having its driven elements connected in driving relation with said first and second shaft respectively, a second differential having one driven element connected in driving relation with said third shaft, and its other driven element connected in driving relation with the driving element of said first differential, and means for driving said last mentioned element from said driving shaft.

3. The combination with a driving and a driven shaft, of means for driving said driven shaft at various speeds relative to said driving shaft comprising a plurality of gears of different sizes, connected to drive said driven shaft, a first differential, selective means for connecting either, or both, of the driven elements of said differential with any of said plurality of gears, a second differential having one driven element connected with the driving element of said first differential, selective means for connecting the other driven element with any one of said plurality of gears, and means for connecting the driving element of said second differential with said driving shaft.

4. The combination with a driving shaft and a driven shaft of means for driving said driven shaft at various speeds relative to said driving shaft comprising a plurality of gears, of different sizes, connected to drive said driven shaft, a variable ratio driving connection between said driving shaft and said gears comprising selective means for engaging any one of said gears, means controlled by the movement of said gears for controlling said variable ratio driving means comprising, means for selectively engaging any one of said gears, the said controlling means comprising a second variable ratio driving connection, and means driven by said gears for controlling said second variable ratio driving connection comprising selective means for establishing driving connections with any one of said gears.

5. The combination of a driving shaft and a driven shaft of a variable speed driving connection therebetween comprising three different gear trains, and connections between two of said gear trains and the third for varying the speed ratio between said driving and driven shafts effected by said third gear train, the said connections comprising a differential.

6. The combination of a driving shaft and a driven shaft of a variable speed driving connection therebetween comprising three different gear trains, and connections between two of said gear trains and the third for varying the speed ratio between said driving and driven shafts effected by said third gear train.

7. The combination of a driving shaft and a driven shaft, of driving connections between said shafts comprising two differentials connected in parallel, and adjustable means for controlling the action of said differentials, to cause the speed of the driven shaft to vary by arithmetical increments or decrements, the said last named means being driven from one of said shafts.

8. The combination of a driving shaft and a driven shaft, of driving connections between said shafts comprising two differentials connected in parallel, and adjustable means for controlling the action of said differentials, to cause the speed of the driven shaft to vary by arithmetical increments or decrements.

9. The combination with a driving shaft and a driven shaft, of means for connecting said shafts in driving relation comprising a pair of differentials, and a plurality of gear trains connected in parallel through said pair of differentials, the said differentials being connected in parallel, and means for separately varying the speed of each of said gear trains.

10. The combination with a driving shaft and a driven shaft, of means for connecting said shafts in driving relation comprising a pair of differentials, and a plurality of gear trains connected in parallel through said pair of differentials, and means for separately varying the speed of each of said gear trains.

11. The combination with a driving shaft and a shaft driven therefrom, of means located between said shafts for varying the speed relations of the two shafts comprising, a gear connected in driving relation to said driven shaft, a differential, means for connecting one of the driven elements of said differential in driving relation with said gear, means for locking the other driven element of said differential or connecting it in driving relation with said gear, and a driving connection between said driving shaft and the driving element of said differential.

12. In mechanism of the character described, a drive shaft, a driven shaft, a differential head keyed to one of said shafts, transmission shafts arranged on opposite sides of and parallel to the other of said shafts, pinion gears journalled in said differential head, idlers journalled on the shaft to which said differential head is keyed and arranged on opposite sides of said differential head to mesh with the pinions journalled therein, said idlers being geared to said transmission shafts, and variable geared means for connecting each of said transmission shafts to the other of said drive and driven shafts.

In witness whereof, I hereunto subscribe my name this 15th day of June, 1920.

OSCAR CHRISTIAN SCHROEDER.